United States Patent
Wang et al.

(10) Patent No.: US 12,255,562 B2
(45) Date of Patent: Mar. 18, 2025

(54) CURRENT CONTROL METHOD AND MOTOR CONTROL CIRCUIT

(71) Applicant: JIANGSU DONGCHENG TOOLS TECHNOLOGY CO., LTD., Jiangsu (CN)

(72) Inventors: Haodong Wang, Jiangsu (CN); Jianan Huang, Jiangsu (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 136 days.

(21) Appl. No.: 18/089,558

(22) Filed: Dec. 27, 2022

(65) Prior Publication Data
US 2023/0132553 A1 May 4, 2023

Related U.S. Application Data

(63) Continuation of application No. PCT/CN2022/098288, filed on Jun. 11, 2022.

(30) Foreign Application Priority Data

Jul. 23, 2021 (CN) .......................... 202110835779.9

(51) Int. Cl.
*H02P 23/14* (2006.01)
*H02P 23/00* (2016.01)
*H02P 25/03* (2016.01)

(52) U.S. Cl.
CPC .......... *H02P 23/14* (2013.01); *H02P 23/0004* (2013.01); *H02P 25/03* (2016.02); *H02P 2205/01* (2013.01); *H02P 2209/11* (2013.01)

(58) Field of Classification Search
CPC ...... H02P 23/14; H02P 23/0004; H02P 25/03; H02P 2205/01; H02P 2209/11;
(Continued)

(56) References Cited

U.S. PATENT DOCUMENTS

| | | | | |
|---|---|---|---|---|
| 4,965,504 A | * | 10/1990 | Ueda ................. | H02M 7/53873 318/811 |
| 6,097,171 A | * | 8/2000 | Branecky ............ | H02P 23/0004 318/808 |
| 2003/0067303 A1 | * | 4/2003 | Huber .................... | G01R 31/52 324/509 |

FOREIGN PATENT DOCUMENTS

| CN | 1412934 A | * | 4/2003 |
|---|---|---|---|
| CN | 1801589 A | | 7/2006 |

(Continued)

OTHER PUBLICATIONS

International Search Report of PCT Patent Application No. PCT/CN2022/098288 issued on Aug. 16, 2022.
(Continued)

*Primary Examiner* — Bickey Dhakal (57) ABSTRACT

A current control method and a motor control circuit are provided. The motor control circuit includes a first rectification circuit and a second rectification circuit connected in parallel between a live wire and a natural wire of a power supply, a sampling resistor, and a controller connected to the second rectification circuit. The first rectification circuit is connected to the motor. The current control method include obtaining a periodic waveform signal of a bus voltage; collecting a bus current value through the sampling resistor; sampling the periodic waveform signal for a plurality of times; linearly fitting multiple voltage values obtained at a plurality of sampling time points to obtain multiple slopes; obtaining a power frequency according to the multiple slopes; calculating a compensation current value according to the power frequency; and generating a control signal according to the compensation current value and the bus current value.

20 Claims, 3 Drawing Sheets

(58) Field of Classification Search
CPC .......... H02P 27/08; H02P 6/28; H02P 27/047; H02M 1/0009; H02M 1/0025; H02M 5/45; G01R 23/12; G01R 23/06; G05B 2219/33261; H01L 2924/14251
See application file for complete search history.

(56) References Cited

FOREIGN PATENT DOCUMENTS

| | | | | |
|---|---|---|---|---|
| CN | 101212196 A | 7/2008 | | |
| CN | 101385224 B | 6/2011 | | |
| CN | 106026690 A | * 10/2016 | ............ | H02M 5/458 |
| CN | 106505527 A | 3/2017 | | |
| CN | 106788048 A | 5/2017 | | |
| CN | 105729413 B | 6/2019 | | |
| CN | 112117948 A | 12/2020 | | |
| CN | 212258805 U | 12/2020 | | |
| CN | 113691173 A | 11/2021 | | |
| JP | H08223930 A | 8/1996 | | |
| JP | 2004040856 A | 2/2004 | | |
| JP | 2006246668 A | 9/2006 | | |
| JP | 2008099485 A | 4/2008 | | |
| JP | 2012090460 A | 5/2012 | | |

OTHER PUBLICATIONS

Chinese First Office Action, Chinese Application No. 202110835779.9, mailed Jan. 23, 2024 (16 pages).
Chinese Second Office Action, Chinese Application No. 202110835779.9, mailed Jul. 31, 2024 (14 pages).

* cited by examiner

CURRENT CONTROL METHOD AND MOTOR CONTROL CIRCUIT

CROSS REFERENCE TO RELATED APPLICATIONS

The present application is a continuation-application of International (PCT) Patent Application No. PCT/CN2022/098288, filed on Jun. 11, 2022, which claims priority to Chinese Patent Application No. 202110835779.9 filed with China National Intellectual Property Administration on Jul. 23, 2021, the contents of which are herein incorporated by reference in their entireties.

TECHNICAL FIELD

The present disclosure relates to technical field of motor control, in particular to a current control method and a motor control circuit.

BACKGROUND

An existing alternating-current brushless circuit includes a large electrolytic capacitor, which makes motor control relatively simple. However, the large electrolytic capacitor usually has a large volume and a volume of a circuit board is thus increased. Therefore, in the current conventional scheme, a circuit does not include the large electrolytic capacitor to reduce the volume, and the circuit board has a long service life. However, since the circuit does not include the large electrolytic capacitor but include a capacitor with a small capacitance, a bus voltage is unstable after rectification. Therefore, an unstable working current leads to an unstable output power of the motor. In addition, for a tool that can be used in different alternating-current power supplies, when a correction value is introduced for a current, the tool needs to judge a power frequency. Since a bus waveform after rectification tends to fluctuate with the load, the correction value for the current is inaccurate, thereby affecting an operating performance of the tool.

SUMMARY

The technical solution provided in the present disclosure to solve the problem in the related art is as following. A current control method performed by a motor control circuit for controlling a motor to operate is provided. The motor control circuit includes a power supply including a live wire and a natural wire; a first rectification circuit and a second rectification circuit connected in parallel between a live wire of the power supply and a neutral wire of the power supply and configured to rectify the power supply. The motor control circuit further includes a driving circuit, an output end of the first rectification circuit being connected to the motor through the driving circuit, and a sampling resistor being connected to the driving circuit. The motor control circuit further includes a sampling resistor connected to the driving circuit, and a controller connected to an output end of the second rectification circuit through a voltage detection circuit. the current control method includes: obtaining, by the controller, a periodic waveform signal of a bus voltage; collecting, by the controller, a bus current value through the sampling resistor; sampling, by the controller, the periodic waveform signal for a plurality of times; linearly fitting, by the controller, a plurality of voltage values obtained at a plurality of sampling time points to obtain a plurality of slopes; obtaining a power frequency according to the plurality of slopes; calculating, by the controller, a compensation current value according to the power frequency; and generating a control signal according to the compensation current value and the bus current value to control the motor.

A motor control circuit for controlling a motor to operate is provided and includes a power supply including a live wire and a natural wire; a first rectification circuit and a second rectification circuit, connected in parallel between the live wire of the power supply and the natural wire of the power supply and configured to rectify the power supply; a driving circuit, an output end of the first rectification circuit is connected to the motor through the driving circuit; a sampling resistor connected to the driving circuit; and a controller connected to an output end of the second rectification circuit through a voltage detection circuit, the controller is configured to: obtain a periodic waveform signal of a bus voltage; collect a bus current value through the sampling resistor; sample the periodic waveform signal for a plurality of times; linearly fit a plurality of voltage values obtained at a plurality of sampling time points t to obtain a plurality of slopes; obtain a power frequency f according to the plurality of slopes; calculate a compensation current value according to the power frequency; and generate a control signal according to the compensation current value and the bus current value to control the motor.

A motor control circuit for controlling a brushless motor is provided and includes a power supply including a live wire and a natural wire; a first rectification circuit, connected in parallel between the live wire of the power supply and the natural wire of the power supply, configured to rectify the power supply and including an output end connected to a driving circuit through a capacitor connected in parallel to the driving circuit, the driving circuit is further connected to the brushless motor, and the capacitor has an equivalent capacitance value of less than 15 uF; a second rectification circuit, connected in parallel between the live wire of the power supply and the natural wire of the power supply, and configured to rectify the power supply; a sampling resistor, connected to the driving circuit; and a controller, connected to an output end of the second rectification circuit through a voltage detection circuit, and configured to compensate a bus current and control the brushless motor by using the compensated bus current.

BRIEF DESCRIPTION OF THE DRAWINGS

Specific embodiments of the present disclosure are further described in detail below in combination with drawings.

Reference labels in the drawings.

First rectification circuit 1, second rectification circuit 2, driving circuit 3, motor 4, controller 5, logic operation unit 51, storage unit 52, timing unit 53, PWM generator 54, driving module 6, bus-current collecting unit 7, filter unit 8.

DETAILED DESCRIPTION

The present disclosure is further described in detail below in combination with the drawings and embodiments.

Figure 1:
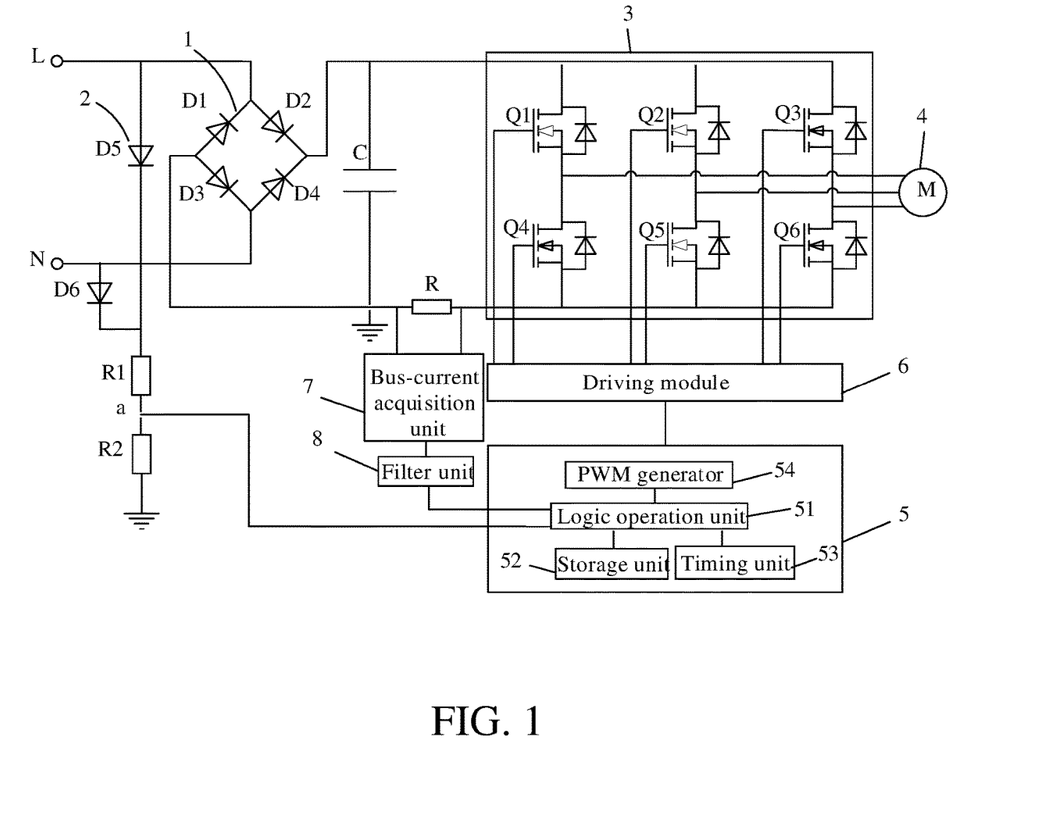
FIG. 1 is a schematic diagram of a control circuit of a current control method according to some embodiments of the present disclosure.

As shown in FIG. 1, a motor control circuit is provided in some embodiments of the present disclosure. The motor control circuit may include an alternating-current power supply, a first rectification circuit 1 and a second rectification circuit 2 which are connected in parallel between a live wire L of the alternating-current power supply and a neutral wire N of the alternating-current power supply and configured to rectify the alternating-current power supply. An output end of the first rectification circuit 1 is connected to a motor 4 through a driving circuit 3, and an output end of the second rectification circuit 2 is connected to a controller 5. The controller 5 is connected to the driving circuit 3 through a driving module 6 to drive the motor 4 to operate.

The first rectification circuit 1 is a bridge-type full wave rectification circuit constituted by connecting four diodes D1, D2, D3, and D4 for rectification end to end. The live wire L of the alternating-current power supply is connected to a negative pole of the diode D1 and a positive pole of the diode D2. A positive pole of the diode D1 is connected to a positive pole of diode D3 and then further connected to the driving circuit 3. A negative pole of diode D2 is connected to a negative pole of diode D4 and then further connected to the driving circuit 3. The neutral wire N of the alternating-current power supply is connected to a negative pole of diode D3 and a positive pole of diode D4. A capacitor C is connected in parallel between the output end of the first rectification circuit 1 and the driving circuit 3, and the capacitor C is grounded. A voltage input by the alternating-current power supply is full-wave rectified by the first rectification circuit 1, and the full-wave rectified voltage is input to the driving circuit 3 through the capacitor C. A current sampling resistor R is connected in series on a negative bus configured between the capacitor C and the driving circuit 3. A bus-current collecting unit 7 is connected at both ends of the current sampling resistor R, and is connected to the controller 5 through a filter unit 8. The bus-current collecting unit 7 is configured to collect a bus current value through the current sampling resistor R.

The second rectification circuit 2 may include a diode D5 and a diode D6 connected in parallel between the first rectification circuit 1 and the power supply. A positive pole of the diode D5 is connected to the live wire L of the alternating-current power supply, and a positive pole of the diode D6 is connected to the neutral wire N of the alternating-current power supply. Negative poles of the diode D5 and D6 are connected to each other, and are connected to the controller 5 through a voltage detection circuit.

The voltage detection circuit may include a first resistor R1 and a second resistor R2 connected in series. The other end of the first resistor R1 is connected to the output end of the second rectification circuit 2, a connection point of the first resistor R1 and the second resistor R2 is connected to the controller 5, and another end of the second resistor R2 is grounded. Since the voltage detection circuit and the capacitor C are grounded and equipotential, the first rectification circuit 1 shares the diodes D1 and D3 with the second rectification circuit 2. In this embodiment, a resistance value of the first resistor R1 is 750KΩ, and a resistance value of the second resistor R2 is 6.8KΩ, that is, a voltage collected at point a of the voltage detection circuit is a voltage value of the second resistor R2, such that the output voltage of the second rectification circuit 2 falls into a voltage range which is recognizable the controller 5.

The driving circuit 3 may include an upper bridge arm and a lower bridge arm, the upper bridge arm may include switch tubes Q1, Q2 and Q3, the lower bridge arm may include switch tubes Q4, Q5 and Q6, and each of the switch tubes is reversely connected in parallel with a diode. The motor 4 may be a brushless motor and include a three-phase winding. Each end of the three-phase winding is respectively connected to the corresponding connection points of the upper and lower bridge arms. The voltage input to the motor 4 may be controlled by turning on and turning off the switch tubes Q1 to Q6.

Figure 2:
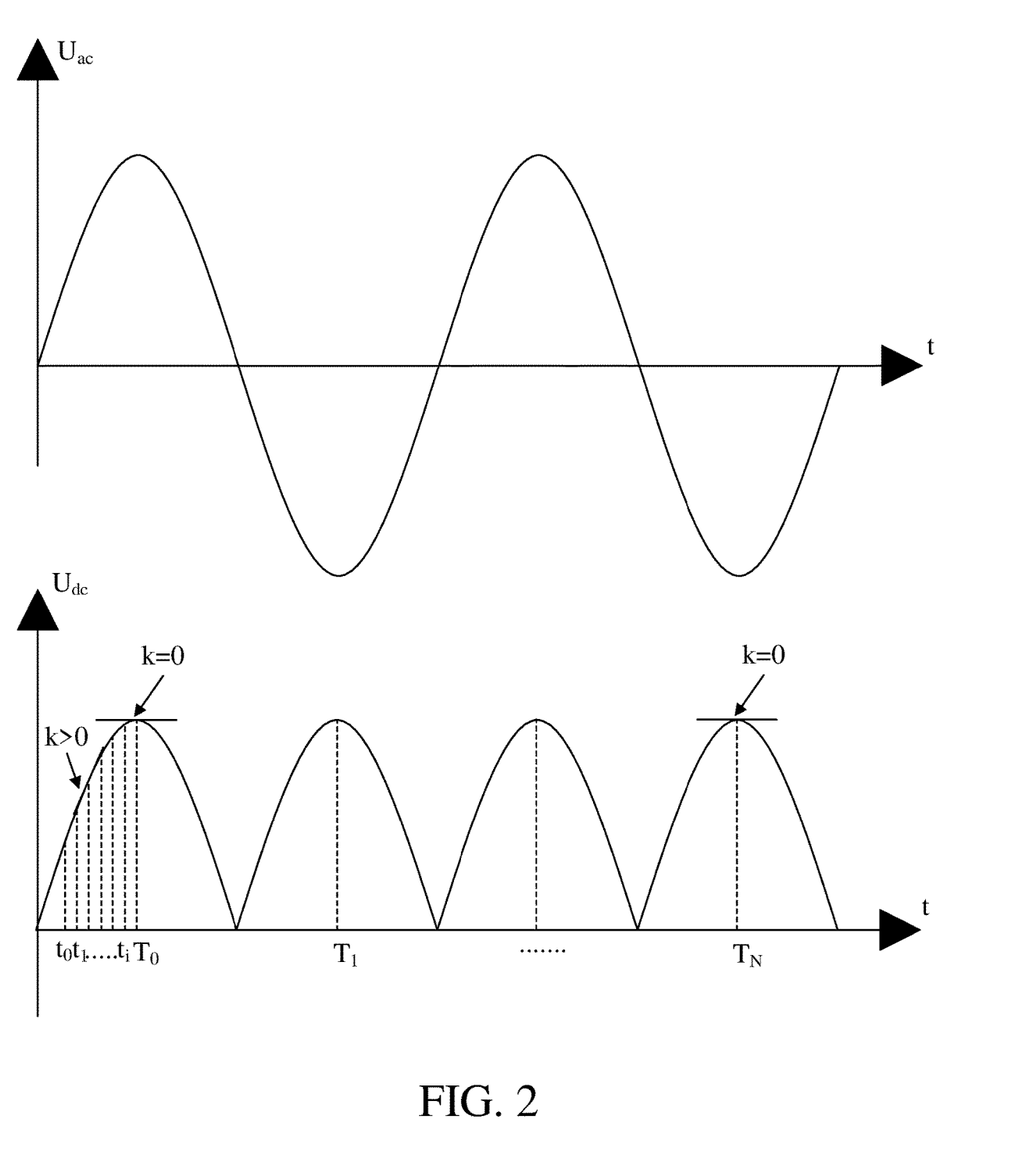
FIG. 2 is a schematic view of waveforms of a rectification input voltage and a rectification output voltage of a current control method according to some embodiments of the present disclosure.

The controller 5 may include a logic operation unit 51, a storage unit 52 connected to the logic operation unit 51, a timing unit 53 connected to the logic operation unit 51, and a pulse width modulation (PWM) generator 54 connected to the logic operation unit 51. Generally, in order to reduce a volume of the circuit board, a capacitor with a small equivalent capacitance value is configured to filter. For example, in this embodiment, a capacitor C with an equivalent capacitance value of less than 15 uF is arranged in the circuit board. Therefore, when a load changes, a voltage output from the capacitor C varies according to or along with the load, resulting in waveform distortion. A standard periodic waveform signal of the bus voltage may be obtained by collecting the voltage of the second rectification circuit 2. As shown in FIG. 2, a waveform $U_{ac}$ is an input voltage of the alternating-current power supply, and waveform $U_{dc}$ is an output voltage of the second rectification circuit 2 which is output through the voltage detection circuit. The waveform corresponds to the bus voltage value in this embodiment, and the waveform does not vary according to or along with the load. Generally, a bus current varies according to a voltage. Therefore, the bus current needs to be compensated. A slope k is obtained by multiple samplings for the periodic waveform signal and linearly fitting a plurality of voltage values u obtained at a plurality of sampling time points t. Each of the slopes k corresponds to a phase φ of the periodic waveform signal. A power frequency f is obtained according to the slope k. The controller 5 calculates a compensation current value $i_{comp}$ according to the power frequency f, generates a control signal according to the compensation current value $i_{comp}$ and the bus current value $i_{fdb}$, and send the control signal to the PWM generator 54, to control the motor 4.

The controller 5 stores a voltage preset value. In response to the controller 5 detecting that the voltage value u is greater than the voltage preset value, the controller 5 is configured to start to collect each of the plurality of voltage values u corresponding to each of the sampling time points t. The logic operation unit 51 is configured to calculate each of the slopes k of the periodic waveform signal through linear fitting, and a formula for calculating each of the slopes k is $$k = \frac{E(t*u) - Et*Eu}{E(t^2) - (Et)^2}.$$

Herein, E (t*u) is a mathematical expectation of a product of a corresponding one the sampling time points t and a corresponding one the voltage values u, Et*Eu is a product of a mathematical expectation of the sampling time point t and a mathematical expectation of the corresponding one the voltage values u, E (t²) is a mathematical expectation of a square of the corresponding one the sampling time points t, and (Et)² is a square of the mathematical expectation of the corresponding one the sampling time points t.

Figure 3:
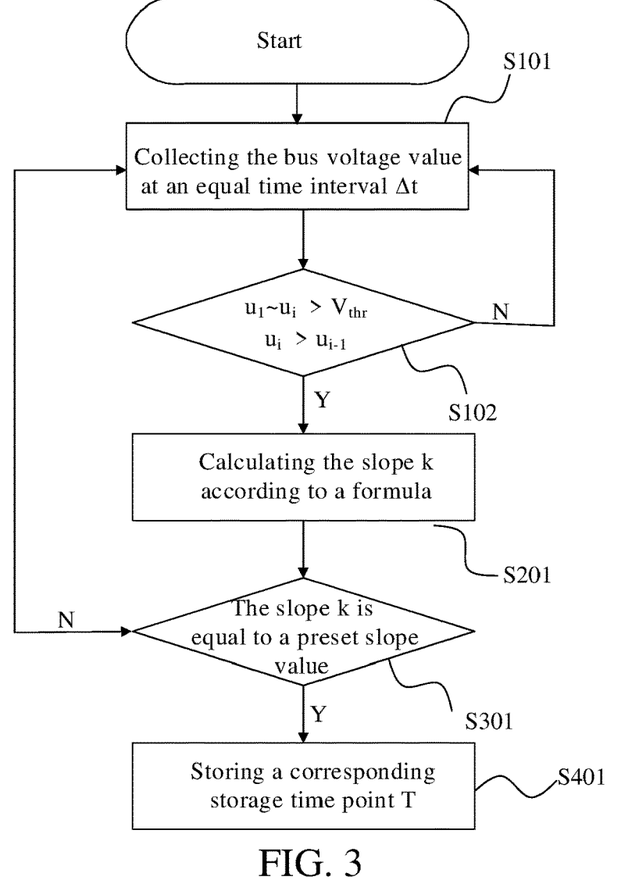
FIG. 3 is a flowchart of a slope algorithm of a current control method according to some embodiments of the present disclosure.

Specifically, the periodic waveform signal may be sampled within a preset sampling duration. As shown in FIGS. 2 and 3, calculation operations of the power supply frequency are as follows. Operation S101 may include: collecting the bus voltage value at an equal time interval Δt, and collecting the voltage value u of the periodic waveform signal at the sampling time point t. The sampling time points t may include or be defined as sampling time points $t_0$, $t_1$, $t_2$, ..., t, and collected voltage values $u_0$, $u_1$, $u_2$, ..., $u_i$ correspond to the sampling time points $t_0$, $t_1$, $t_2$, ..., t in one-to-one correspondence respectively, i indicates the number of sampling points, the time interval are defined as Δt, $\Delta t = t_{i+1} - t_i$, the time intervals Δt are the same as or equal to each other. Operation S102 may include: in response to detecting that a voltage value $u_i$ corresponding to the periodic waveform signal at a current sampling time point t is greater than a voltage value $u_{i-1}$ corresponding to the periodic waveform signal at a previous sampling time point t relative to the sampling time point t, and each of the voltage values u (including $u_1 \sim u_i$) is greater than a preset voltage threshold $V_{thr}$, that is, in response to detecting $u_i > u_{i-1}$ and $u_1 \sim u_i > V_{thr}$, starting to collect each of the voltage values u corresponding to the each of the sampling time points t, and calculate each of the slopes k. Operation S201 may include: calculating each of the slopes k according to a formula $$k = \left[ n * \sum_{i=0}^{n-1}(ti*ui) - \sum_{i=0}^{n-1}ti * \sum_{i=0}^{n-1}ui \right] / \left[ n * \sum_{i=0}^{n-1}ti^2 - \sum_{i=0}^{n-1}ti * \sum_{i=0}^{n-1}ti \right].$$

Herein, n is a positive integer greater than 1, i=0, 1, 2, ... n−1, $\Sigma_{i=0}^{n-1}(ti*ui)$ indicates a sum of a product of $t_i$ and $u_i$ of each of n sampling points, $\Sigma_{i=0}^{n-1}ti * \Sigma_{i=0}^{n-1}ui$ includes n sample points and indicates a product of a sum of each $t_i$ and a sum of each $u_i$, $\Sigma_{i=0}^{n-1}ti^2$ includes n sampling points and indicates a sum of a square of each $t_i$, $\Sigma_{i=0}^{n-1}ti * \Sigma_{i=0}^{n-1}ti$ includes n sampling points and indicates a square of a sum of ti. In order to further reduce a calculation overhead of software, the positive integer n=$2^m$, and m is a positive integer. Operation S301 may include: determining whether the slope k is equal to a preset slope value. The controller 5 stores the preset slope value. In this embodiment, the preset slope value is 0, that is, a phase of a corresponding periodic waveform signal is 90°. In other embodiments, the preset slope value may be any value. Operation S401 may include: in response to determining that the slope k is equal to the preset slope value, storing a corresponding storage time point T; in response to determining that the slope k is not equal to the preset slope value, returning to operation S101 and performing the determination process again. The multiple samplings are performed according to above operations to obtain N time points at which the slope k is equal to the preset slope value. A time point at which a corresponding slope k being equal to the preset slope value is obtained for the first time is a starting time point defined as $T_0$, and a time point at which the Nth slope k being equal to the preset slope value is obtained is a final time point defined as $T_N$. The final time point $T_N$ is the time point at which the periodic waveform signal is N times of 90°. A periodic duration defined as $T_p$ and is calculated according to a formula $T_p = (T_N - T_0)/N$. The controller 5 obtains the power frequency f by calculating a reciprocal of the periodic duration.

Figure 4:
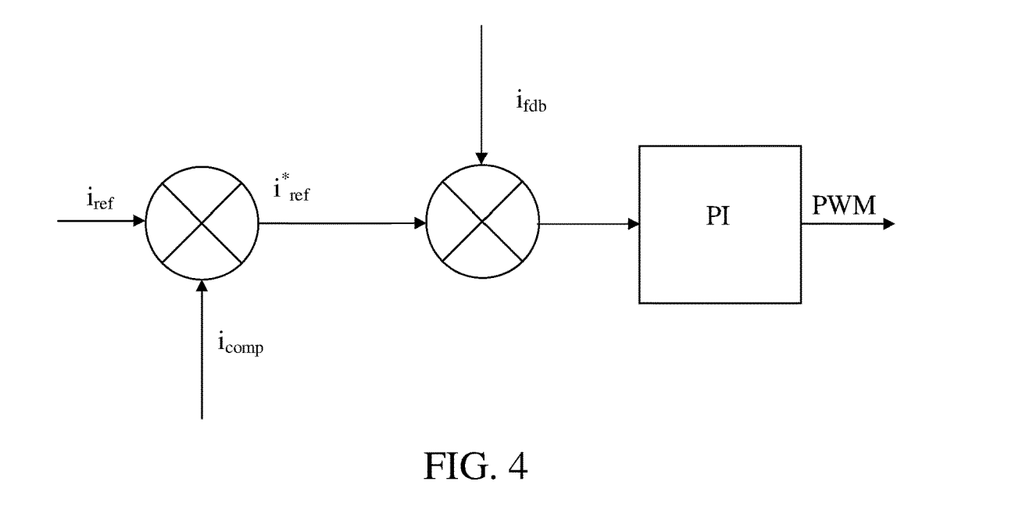
FIG. 4 is a schematic diagram of a current-correction circuit of a control method according to some embodiments of the present disclosure.

As shown in FIG. 4, FIG. 4 is a schematic diagram of a current-correction circuit. The controller 5 stores a capacitance value of the capacitor C, and calculates the compensation current value $i_{comp}$, by a formula, according to the voltage value u and the power frequency f. The formula for calculating the compensation current value $i_{comp}$ is $\sqrt{2}C_{dc}U\omega_{in}\cos(\omega_{in}t)\,\text{sign}(\sin(\omega_{in}t))$. Herein, $C_{dc}$ is the capacitance value, U is an effective value of a sampled voltage u, $\omega_{in}$ is an angular frequency of the power supply, $\omega_{in}$ is equal to 2πf, and sign is a symbolic function. The controller 5 stores a target current reference value $i_{ref}$, and a correction current reference value $i*_{ref}$ is obtained by subtracting the compensation current value $i_{comp}$ from the target current reference value $i_{ref}$. PI (proportional integral) control processing is performed on the bus current value $i_{fdb}$ and the correction current reference value $i*_{ref}$ to obtain the control signal. The controller 5 changes the duty ratio according to the control signal to drive motor 4. By changing the compensation current value $i_{comp}$ in real time, the current can be compensated in real time with a phase change of the periodic waveform signal to ensure stability of the bus current, thereby stabilizing output power.

A current control method performed by a motor control circuit for controlling a motor to operate is provided. The motor control circuit includes a power supply including a live wire and a natural wire; a first rectification circuit and a second rectification circuit connected in parallel between a live wire of the power supply and a neutral wire of the power supply and configured to rectify the power supply. The motor control circuit further includes a driving circuit, an output end of the first rectification circuit being connected to the motor through the driving circuit, and a sampling resistor being connected to the driving circuit. The motor control circuit further includes a sampling resistor connected to the driving circuit, and a controller connected to an output end of the second rectification circuit through a voltage detection circuit. the current control method includes: obtaining, by the controller, a periodic waveform signal of a bus voltage; collecting, by the controller, a bus current value through the sampling resistor; sampling, by the controller, the periodic waveform signal for a plurality of times; linearly fitting, by the controller, a plurality of voltage values obtained at a plurality of sampling time points to obtain a plurality of slopes; obtaining a power frequency according to the plurality of slopes; calculating, by the controller, a compensation current value according to the power frequency; and generating a control signal according to the compensation current value and the bus current value to control the motor.

In some embodiments, the voltage detection circuit includes a first resistor and a second resistor in series, the other end of the first resistor is connected to the output end of the second rectification circuit, a connection point of the first resistor and the second resistor is connected to the controller, and the other end of the second resistor is grounded.

In some embodiments, the output end of the first rectification circuit is connected to the driving circuit through a capacitor connected in parallel, and an end of the capacitor is grounded; the first rectification circuit includes four diodes, and two diodes of the first rectification circuit are shared with the second rectification circuit.

In some embodiments, the controller stores a voltage preset value, and the controller is configured to start to collect each of the plurality of voltage values corresponding to each of the sampling time points in response to the controller detecting that each of the voltage values is greater than the voltage preset value.

In some embodiments, the controller includes a logic operation unit, and the logic operation unit is configured to calculate each of the slopes of the periodic waveform signal through linear fitting; a formula for calculating each of the slopes is $$k = \frac{E(t*u) - Et*Eu}{E(t^2) - (Et)^2};$$

t is a sampling time point; u is a voltage value; k is a slope; E (t*u) is a mathematical expectation of a product of a corresponding one of the sampling time points and a corresponding one of the voltage values; Et*Eu is a product of a mathematical expectation of the corresponding one the sampling time points and a mathematical expectation of the corresponding one the voltage values; E ($t^2$) is a mathematical expectation of a square of the corresponding one the sampling time points; and (Et)$^2$ is a square of a mathematical expectation of the corresponding one the sampling time points.

In some embodiments, the sampling time points include sampling time points defined as $t_0, t_1, t_2, \ldots, t$, the voltage value includes voltage values defined as $u_0, u_1, u_2, \ldots, u_i$, and the sampling time points $t_0, t_1, t_2, \ldots, t$ correspond to voltage values $u_0, u_1, u_2, \ldots, u_i$ in one-to-one correspondence respectively; i indicates the number of sampling points, time intervals are defined as $\Delta t$, $\Delta t = t_{i+1} - t_i$, and the time intervals $\Delta t$ are equal to each other.

In some embodiments, the logic operation unit is configured to calculate each of the slopes of the periodic waveform signal through linear fitting, and the formula for calculating each of the slopes is $$k = \left[ n * \sum_{i=0}^{n-1}(ti*ui) - \sum_{i=0}^{n-1}ti * \sum_{i=0}^{n-1}ui \right] \bigg/ \left[ n * \sum_{i=0}^{n-1}ti^2 - \sum_{i=0}^{n-1}ti * \sum_{i=0}^{n-1}ti \right],$$

n is a positive integer greater than 1.

In some embodiments, the controller stores a preset slope value; a time point at which a corresponding slope being equal to the preset slope value is obtained for the first time is a starting time point defined as $T_0$, and a time point at which the Nth slope being equal to the preset slope value is obtained is a final time point defined as $T_N$; a periodic time defined as $T_p$ and is calculated according to a formula $T_p = (T_N - T_0)/N$; and the controller is configured to obtain the power frequency by calculating a reciprocal of the periodic time.

In some embodiments, the preset slope value is 0, the starting time point is a time point at which the periodic waveform signal is 90°, and the final time point is time point at which the periodic waveform signal is N times of 90°.

In some embodiments, the controller stores a capacitance value of the capacitor, and is configured to calculate the compensation current value, by a formula, according to the voltage value and the power frequency. The formula for calculating the compensation current value is $\sqrt{2}C_{dc}U\omega_{in}\cos(\omega_{in}t)\text{sign}(\sin(\omega_{in}t))$, $C_{dc}$ is a capacitance value; U is an effective value of a sampled voltage; $\omega_{In}$ is an angular frequency of the power supply; and sign is a symbolic function.

In some embodiments the controller stores a target current reference value, a correction current reference value is obtained by subtracting the compensation current value from the target current reference value, a proportional integral control processing is performed on the bus current value and the correction current reference value to obtain the control signal, and the controller is configured to changes a duty ratio according to the control signal to drive the motor.

A motor control circuit for controlling a motor to operate is provided and includes a power supply including a live wire and a natural wire; a first rectification circuit and a second rectification circuit, connected in parallel between the live wire of the power supply and the natural wire of the power supply and configured to rectify the power supply; a driving circuit, an output end of the first rectification circuit is connected to the motor through the driving circuit; a sampling resistor connected to the driving circuit; and a controller connected to an output end of the second rectification circuit through a voltage detection circuit, the controller is configured to: obtain a periodic waveform signal of a bus voltage; collect a bus current value through the sampling resistor; sample the periodic waveform signal for a plurality of times; linearly fit a plurality of voltage values obtained at a plurality of sampling time points t to obtain a plurality of slopes; obtain a power frequency f according to the plurality of slopes; calculate a compensation current value according to the power frequency; and generate a control signal according to the compensation current value and the bus current value to control the motor.

In some embodiments, the voltage detection circuit includes a first resistor and a second resistor connected in series, the other end of the first resistor is connected to the output end of the second rectification circuit, a connection point of the first resistor and the second resistor is connected to the controller, and the other end of the second resistor is grounded.

In some embodiments, the output end of the first rectification circuit is connected to the driving circuit through a capacitor connected in parallel, and an end of the capacitor is grounded; the first rectification circuit includes four diodes, and two diodes of the first rectification circuit are shared with the second rectification circuit.

In some embodiments, the first rectification circuit is a bridge-type full wave rectification circuit constituted by connecting a first diode, a second diode, a third diode, and a fourth diode for rectification end to end, the live wire is connected to a negative pole of the first diode and a positive pole of the second diode, a positive pole of the first diode is connected to a positive pole of the third diode and then further connected to the driving circuit, a negative pole of the second diode is connected to a negative pole of the fourth diode and then further connected to the driving circuit, the neutral wire is connected to a negative pole of the third diode and a positive pole of the fourth diode; a voltage input by the power supply is full-wave rectified by the first rectification circuit, and the full-wave rectified voltage is input to the driving circuit through the capacitor, a current sampling resistor is connected in series on a negative bus configured between the capacitor and the driving circuit, a bus-current collecting unit is connected at both ends of the current sampling resistor and is connected to the controller through a filter unit, the bus-current collecting unit is configured to collect a bus current value through the current sampling resistor.

In some embodiments, the second rectification circuit include a fifth diode and a sixth diode connected in parallel between the first rectification circuit and the power supply, a positive pole of the fifth diode is connected to the live wire, and a positive pole of the sixth diode is connected to the neutral wire, negative poles of the fifth diode and the sixth diode are connected to each other and are connected to the controller through the voltage detection circuit.

In some embodiments, the controller stores a voltage preset value, and the controller is configured to start to collect each of the plurality of voltage values corresponding to each of the sampling time points in response to the controller detecting that each of the voltage values is greater than the voltage preset value.

In some embodiments, the controller includes a logic operation unit, and the logic operation unit is configured to calculate each of the slopes of the periodic waveform signal through linear fitting; a formula for calculating each of the slopes is $$k = \frac{E(t*u) - Et*Eu}{E(t^2) - (Et)^2};$$

t is a sampling time point; u is a voltage value; k is a slope; E (t*u) is a mathematical expectation of a product of a corresponding one of the sampling time points and a corresponding one of the voltage values; Et*Eu is a product of a mathematical expectation of the corresponding one of the sampling time points and a mathematical expectation of the corresponding one of the voltage values; E ($t^2$) is a mathematical expectation of a square of the corresponding one of the sampling time points; and $(Et)^2$ is a square of a mathematical expectation of the corresponding one of the sampling time points.

In some embodiments, the sampling time points include sampling time points defined as $t_0, t_1, t_2, \ldots, t$, the voltage value includes voltage values defined as $u_0, u_1, u_2, \ldots, u_i$, and the sampling time points $t_0, t_1, t_2, \ldots, t$ correspond to voltage values $u_0, u_1, u_2, \ldots, u_i$ in one-to-one correspondence respectively; i indicates the number of sampling points, time intervals are defined as $\Delta t$, $\Delta t = t_{i+1} - t_i$, and the time intervals $\Delta t$ are equal to each other.

A motor control circuit for controlling a brushless motor is provided and includes a power supply including a live wire and a natural wire; a first rectification circuit, connected in parallel between the live wire of the power supply and the natural wire of the power supply, configured to rectify the power supply and including an output end connected to a driving circuit through a capacitor connected in parallel to the driving circuit, the driving circuit is further connected to the brushless motor, and the capacitor has an equivalent capacitance value of less than 15 uF; a second rectification circuit, connected in parallel between the live wire of the power supply and the natural wire of the power supply, and configured to rectify the power supply; a sampling resistor, connected to the driving circuit; and a controller, connected to an output end of the second rectification circuit through a voltage detection circuit, and configured to compensate a bus current and control the brushless motor by using the compensated bus current.

In the current control method for controlling a motor to operate in some embodiments of the present disclosure, two rectification circuits are arranged, the periodic waveform signal of the bus voltage are obtained from the front rectification circuit, and the power frequency f are obtained through linear fitting. The controller 5 calculates the compensation current value $i_{comp}$ according to the power frequency f, obtains the reference value $i*_{ref}$ of the correction current, and generates the control signal by comparing the reference value $i*_{ref}$ with the bus current value $i_{fdb}$ to control the motor 4. Therefore, a relatively stable bus voltage may be collected even if a non-polar capacitor is used, and the bus current may be accurately corrected, thereby stabling the output power.

The present disclosure is not limited to above specific embodiments. Those skilled can easily understand that there are many other alternatives to the current control methods of the present disclosure without departing from the principle and scope of the present disclosure. The scope of the present disclosure is subject to the claims.

What is claimed is:

1. A current control method performed by a controller of a motor control circuit for controlling a motor to operate, wherein the current control method comprises:

obtaining, a periodic waveform signal of a bus voltage through the motor control circuit; wherein the motor control circuit comprises a power supply, a first rectification circuit, a second rectification circuit, a driving circuit, and a sampling resistor; the power supply comprises a live wire and a natural wire, the first rectification circuit and the second rectification circuit are connected in parallel between the live wire of the power supply and the natural wire of the power supply and configured to rectify the power supply, and the controller is connected to an output end of the second rectification circuit through a voltage detection circuit;

collecting, a bus current value through the sampling resistor; wherein the sampling resistor is connected to the driving circuit, and an output end of the first rectification circuit is connected to the motor through the driving circuit;

sampling, the periodic waveform signal for a plurality of times;

linearly fitting, a plurality of voltage values obtained at a plurality of sampling time points to obtain a plurality of slopes;

obtaining a power frequency according to the plurality of slopes;

calculating, a compensation current value according to the power frequency; and generating a control signal according to the compensation current value and the bus current value to control the motor.

2. The current control method according to claim 1, wherein the controller stores a voltage preset value, and the linearly fitting a plurality of voltage values obtained at a plurality of sampling time points to obtain a plurality of slopes, comprises:

starting to collect each of the plurality of voltage values corresponding to each of the sampling time points in response to the controller detecting that each of the voltage values is greater than the voltage preset value.

3. The current control method according to claim 2, wherein the controller comprises a logic operation unit, and the linearly fitting a plurality of voltage values obtained at a plurality of sampling time points to obtain a plurality of slopes, comprises:

calculating, by the logic operation unit, each of the slopes of the periodic waveform signal through linear fitting; a formula for calculating each of the slopes is $$k = \frac{E(t*u) - Et*Eu}{E(t^2) - (Et)^2};$$

wherein t is a sampling time point; u is a voltage value; k is a slope;

E(t*u) is a mathematical expectation of a product of a corresponding one of the sampling time points and a corresponding one of the voltage values;

Et*Eu is a product of a mathematical expectation of the corresponding one of the sampling time points and a mathematical expectation of the corresponding one of the voltage values;

$E(t^2)$ is a mathematical expectation of a square of the corresponding one of the sampling time points; and $(Et)^2$ is a square of a mathematical expectation of the corresponding one of the sampling time points.

4. The current control method according to claim 3, wherein the sampling time points comprise sampling time points defined as $t_0, t_1, t_2, \ldots, t_i$, the voltage value comprises voltage values defined as $u_0, u_1, u_2, \ldots, u_i$, and the sampling time points $t_0, t_1, t_2, \ldots, t_i$ correspond to voltage values $u_0, u_1, u_2, \ldots, u_i$ in one-to-one correspondence respectively;

i indicates the number of sampling points, time intervals are defined as $\Delta t$, $\Delta t = t_{i+1} - t_i$, and the time intervals $\Delta t$ are equal to each other.

5. The current control method according to claim 4, wherein the formula for calculating each of the slopes is $$k = \left[ n * \sum_{i=0}^{n-1}(ti*ui) - \sum_{i=0}^{n-1}ti * \sum_{i=0}^{n-1}ui \right] \bigg/ \left[ n * \sum_{i=0}^{n-1}ti^2 - \sum_{i=0}^{n-1}ti * \sum_{i=0}^{n-1}ti \right],$$

wherein n is a positive integer greater than 1.

6. The current control method according to claim 5, wherein the controller stores a preset slope value; a time point at which a corresponding slope being equal to the preset slope value is obtained for the first time is a starting time point defined as $T_0$, a time point at which the Nth slope being equal to the preset slope value is obtained is a final time point defined as $T_N$, a periodic duration defined as $T_p$, and is calculated according to a formula $T_p = (T_N - T_0)/N$, and the obtaining a power frequency according to the plurality of slopes, comprises:

obtaining the power frequency by calculating a reciprocal of the periodic duration.

7. The current control method according to claim 6, wherein the preset slope value is 0, the starting time point is a time point at which the periodic waveform signal is 90°, and the final time point is time point at which the periodic waveform signal is N times of 90°.

8. The current control method according to claim 7, wherein the controller stores a capacitance value of a capacitor, and is configured to calculate the compensation current value, by a formula, according to the voltage value and the power frequency, and the formula for calculating the compensation current value is $\sqrt{2} C_{dc} U \omega_{in} \cos(\omega_{in} t)$ sign $(\sin(\omega_{in} t))$, wherein $C_{dc}$ is a capacitance value;

U is an effective value of a sampled voltage;

$\omega_{in}$ is an angular frequency of the power supply; and sign is a symbolic function.

9. The current control method according to claim 1, wherein the controller stores a target current reference value, and the generating a control signal according to the compensation current value and the bus current value to control the motor, comprises:

obtaining a correction current reference value by subtracting the compensation current value from the target current reference value, performing a proportional integral control processing on the bus current value and the correction current reference value to obtain the control signal, and changing a duty ratio according to the control signal to drive the motor.

10. A motor control circuit for controlling a motor to operate, the motor control circuit comprising:

a power supply, comprising a live wire and a natural wire;

a first rectification circuit and a second rectification circuit, connected in parallel between the live wire of the power supply and the natural wire of the power supply, and configured to rectify the power supply;

a driving circuit, wherein an output end of the first rectification circuit is connected to the motor through the driving circuit;

a sampling resistor, connected to the driving circuit; and a controller, connected to an output end of the second rectification circuit through a voltage detection circuit, wherein the controller is configured to:

obtain a periodic waveform signal of a bus voltage;

collect a bus current value through the sampling resistor;

sample the periodic waveform signal for a plurality of times;

linearly fit a plurality of voltage values obtained at a plurality of sampling time points t to obtain a plurality of slopes;

obtain a power frequency f according to the plurality of slopes;

calculate a compensation current value according to the power frequency; and generate a control signal according to the compensation current value and the bus current value to control the motor.

11. The motor control circuit according to claim 10, wherein the voltage detection circuit comprises a first resistor and a second resistor connected in series, the other end of the first resistor is connected to the output end of the second rectification circuit, a connection point of the first resistor and the second resistor is connected to the controller, and the other end of the second resistor is grounded.

12. The motor control circuit according to claim 11, wherein the output end of the first rectification circuit is connected to the driving circuit through a capacitor connected in parallel, and an end of the capacitor is grounded; the first rectification circuit comprises four diodes, and two diodes of the first rectification circuit are shared with the second rectification circuit.

13. The motor control circuit according to claim 12, wherein the first rectification circuit is a bridge-type full wave rectification circuit constituted by a first diode, a second diode, a third diode, and a fourth diode connected end to end, the live wire is connected to a negative pole of the first diode and a positive pole of the second diode, a positive pole of the first diode is connected to a positive pole of the third diode and further connected to the driving circuit, a negative pole of the second diode is connected to a negative pole of the fourth diode and further connected to the driving circuit, the neutral wire is connected to a negative pole of the third diode and a positive pole of the fourth diode; a current sampling resistor is connected in series on a negative bus configured between the capacitor and the driving circuit, a bus-current collecting unit is connected at both ends of the current sampling resistor and is connected to the controller through a filter unit, the bus-current collecting unit is configured to collect a bus current value through the current sampling resistor.

14. The motor control circuit according to claim 11, wherein the second rectification circuit comprises a fifth diode and a sixth diode connected in parallel between the first rectification circuit and the power supply, a positive pole of the fifth diode is connected to the live wire, and a positive pole of the sixth diode is connected to the neutral wire, negative poles of the fifth diode and the sixth diode are connected to each other and are connected to the controller through the voltage detection circuit.

15. The motor control circuit according to claim 12, wherein the controller stores a voltage preset value, and the controller is configured to start to collect each of the plurality of voltage values corresponding to each of the sampling time points in response to the controller detecting that each of the voltage values is greater than the voltage preset value.

16. The motor control circuit according to claim 15, wherein the controller comprises a logic operation unit, and the logic operation unit is configured to calculate each of the slopes of the periodic waveform signal through linear fitting;
a formula for calculating each of the slopes is $$k = \frac{E(t*u) - Et*Eu}{E(t^2) - (Et)^2};$$

wherein
t is a sampling time point; u is a voltage value; k is a slope;
E(t*u) is a mathematical expectation of a product of a corresponding one of the sampling time points and a corresponding one of the voltage values;
Et*Eu is a product of a mathematical expectation of the corresponding one of the sampling time points and a mathematical expectation of the corresponding one of the voltage values;
$E(t^2)$ is a mathematical expectation of a square of the corresponding one of the sampling time points; and
$(Et)^2$ is a square of a mathematical expectation of the corresponding one of the sampling time points.

17. The motor control circuit according to claim 16, wherein the sampling time points comprise sampling time points defined as $t_0, t_1, t_2, \ldots, t_i$, the voltage value comprises voltage values defined as $u_0, u_1, u_2, \ldots, u_i$, and the sampling time points $t_0, t_1, t_2, \ldots, t_i$ correspond to voltage values $u_0, u_1, u_2, \ldots, u_i$ in one-to-one correspondence respectively;
i indicates the number of sampling points, time intervals are defined as $\Delta t$, $\Delta t = t_{i+1} - t_i$, and the time intervals $\Delta t$ are equal to each other.

18. A motor control circuit for controlling a brushless motor, the motor control circuit comprising:
a power supply, comprising a live wire and a natural wire;
a first rectification circuit, connected in parallel between the live wire of the power supply and the natural wire of the power supply, configured to rectify the power supply, and comprising an output end connected to a driving circuit through a capacitor connected in parallel to the driving circuit, wherein the driving circuit is further connected to the brushless motor, and the capacitor has an equivalent capacitance value of less than 15uF;
a second rectification circuit, connected in parallel between the live wire of the power supply and the natural wire of the power supply, and configured to rectify the power supply;
a sampling resistor, connected to the driving circuit; and
a controller, connected to an output end of the second rectification circuit through a voltage detection circuit, and configured to:
obtain a periodic waveform signal of a bus voltage;
collect a bus current value through a sampling resistor;
sample the periodic waveform signal for a plurality of times;
linearly fit a plurality of voltage values obtained at a plurality of sampling time points to obtain a plurality of slopes;
obtain a power frequency according to the plurality of slopes;
calculate a compensation current value according to the power frequency; and
generate a control signal according to the compensation current value and the bus current value to control the brushless motor.

19. The motor control circuit according to claim 18, wherein the controller stores a voltage preset value, and the controller is configured to start to collect each of the plurality of voltage values corresponding to each of the sampling time points in response to the controller detecting that each of the voltage values is greater than the voltage preset value;
the controller comprises a logic operation unit, and the logic operation unit is configured to calculate each of the slopes of the periodic waveform signal through linear fitting;
a formula for calculating each of the slopes is $$k = \frac{E(t*u) - Et*Eu}{E(t^2) - (Et)^2};$$

wherein
t is a sampling time point; u is a voltage value; k is a slope;
E(t*u) is a mathematical expectation of a product of a corresponding one of the sampling time points and a corresponding one of the voltage values;
Et*Eu is a product of a mathematical expectation of the corresponding one of the sampling time points and a mathematical expectation of the corresponding one of the voltage values;
$E(t^2)$ is a mathematical expectation of a square of the corresponding one of the sampling time points; and
$(Et)^2$ is a square of a mathematical expectation of the corresponding one of the sampling time points;
the sampling time points comprise sampling time points defined as $t_0, t_1, t_2, \ldots, t_i$, the voltage value comprises voltage values defined as $u_0, u_1, u_2, \ldots, u_i$, and the sampling time points $t_0, t_1, t_2, \ldots, t_i$ correspond to voltage values $u_0, u_1, u_2, \ldots, u_i$ in one-to-one correspondence respectively;
i indicates the number of sampling points, time intervals are defined as $\Delta t$, $\Delta t = t_{i+1} - t_i$, and the time intervals $\Delta t$ are equal to each other;
the formula for calculating each of the slopes is $$k = \left[ n * \sum_{i=0}^{n-1} (ti*ui) - \sum_{i=0}^{n-1} ti * \sum_{i=0}^{n-1} ui \right] \Big/ \left[ n * \sum_{i=0}^{n-1} ti^2 - \sum_{i=0}^{n-1} ti * \sum_{i=0}^{n-1} ti \right],$$

wherein n is a positive integer greater than 1;
the controller stores a preset slope value; a time point at which a corresponding slope being equal to the preset slope value is obtained for the first time is a starting time point defined as $T_0$, a time point at which the Nth slope being equal to the preset slope value is obtained is a final time point defined as $T_N$, a periodic duration defined as $T_p$ and is calculated according to a formula $T_p=(T_N-T_0)/N$, and the controller is configured to obtain the power frequency by calculating a reciprocal of the periodic duration.

20. The motor control circuit according to claim 18, wherein the controller stores a target current reference value, and is configured to:
  obtain a correction current reference value by subtracting the compensation current value from the target current reference value, perform a proportional integral control processing on the bus current value and the correction current reference value to obtain the control signal, and change a duty ratio according to the control signal to drive the motor.

* * * * *